US009015657B2

(12) United States Patent
Akins et al.

(10) Patent No.: US 9,015,657 B2
(45) Date of Patent: Apr. 21, 2015

(54) SYSTEMS AND METHODS FOR DEVELOPING AND DELIVERING PLATFORM ADAPTIVE WEB AND NATIVE APPLICATION CONTENT

(71) Applicant: Modo Labs, Inc., Cambridge, MA (US)

(72) Inventors: Peter Akins, Belmont, MA (US); Alexandra Ellwood, Somerville, MA (US); Sonya Huang, Boston, MA (US); Eric Kim, Arlington, MA (US); Brian Patt, Cambridge, MA (US); Marshall Vale, Arlington, MA (US)

(73) Assignee: Modo Labs, Inc., Cambridge, MA (US)

( * ) Notice: Subject to any disclaimer, the term of this patent is extended or adjusted under 35 U.S.C. 154(b) by 0 days.

(21) Appl. No.: 14/447,862

(22) Filed: Jul. 31, 2014

(65) Prior Publication Data
US 2015/0040098 A1    Feb. 5, 2015

Related U.S. Application Data

(60) Provisional application No. 61/861,056, filed on Aug. 1, 2013.

(51) Int. Cl.
G06F 9/44    (2006.01)

(52) U.S. Cl.
CPC .. *G06F 8/36* (2013.01); *G06F 8/35* (2013.01); *G06F 8/71* (2013.01)

(58) Field of Classification Search
CPC ................ G06F 8/36; G06F 8/71; G06F 8/35
See application file for complete search history.

(56) References Cited

U.S. PATENT DOCUMENTS

| 8,225,271 | B2* | 7/2012 | Eldridge et al. | 717/101 |
|---|---|---|---|---|
| 8,230,390 | B2* | 7/2012 | Koster | 717/109 |
| 8,601,433 | B2* | 12/2013 | Son et al. | 717/106 |
| 8,789,022 | B2* | 7/2014 | Neogi | 717/126 |
| 8,887,132 | B1* | 11/2014 | Hunter | 717/111 |
| 2006/0123344 | A1* | 6/2006 | Volkov et al. | 715/730 |
| 2010/0037206 | A1* | 2/2010 | Larimore et al. | 717/109 |
| 2011/0246961 | A1* | 10/2011 | Tripathi | 717/105 |
| 2014/0068549 | A1* | 3/2014 | Friedman et al. | 717/104 |

OTHER PUBLICATIONS

Smarty3 Manual, New Digital Group, Inc., Nov. 2010, 285 pages.*
Cazoulat et al., A template based production chain: using richmedia templates to assist users during content production, Aug. 2007, 3 pages.*
Himura et al., Discovering configuration templates of virtualized tenant networks in multi-tenancy datacenters via graph-mining, Jun. 2012, 8 pages.*
C. Kohlschutter, A densitometric analysis of web template content, Apr. 2009, 2 pages.*

* cited by examiner

Primary Examiner — Thuy Dao
(74) Attorney, Agent, or Firm — Goodwin Procter LLP

(57) ABSTRACT

Systems and methods for developing and delivering platform-adaptive web and native application content are disclosed. A hierarchy of templates is provided in which each template includes content compatible with a device that has various associated characteristics, such as particular hardware and software configurations. At least one of the templates has an inheritance relationship with one or more other templates in the hierarchy. A request for content is received from a requesting device. The request includes a device identifier, such as a user agent string, indicative of one or more characteristics associated with the requesting device. One or more of the templates are then selected based on the device identifier and are used to generate content compatible with the requesting device.

24 Claims, 6 Drawing Sheets

SYSTEMS AND METHODS FOR DEVELOPING AND DELIVERING PLATFORM ADAPTIVE WEB AND NATIVE APPLICATION CONTENT

CROSS-REFERENCE TO RELATED APPLICATION

This application claims priority to and the benefit of U.S. Provisional Patent Application No. 61/861,056, filed on Aug. 1, 2013, and entitled "Systems and Methods for Developing and Delivering Platform Adaptive Web and Native Application Content," the entirety of which is incorporated by reference herein.

FIELD OF THE INVENTION

The present invention relates generally to serving device-specific content and, more specifically, to systems and methods for developing and delivering platform-adaptive web and native application content.

BACKGROUND

Delivering mobile web and native applications tailored to different classes of target devices is a challenging endeavor. In many cases, developers must write separate code for each target platform (e.g., iOS, Android, BlackBerry) and include device-specific code for each device (e.g., iPhone 4S, iPhone 5). Other approaches involve keeping a massive database of devices and their characteristics (e.g., Wireless Universal Resource File (WURFL)) and customizing code based on the information included in the database, such as screen size, screen resolution, and other device characteristics.

Existing approaches include Responsive Web Design (RWD), which is a technique that attempts to serve web content to devices of all screen sizes. While RWD addresses the problem of displaying content in multiple types of devices, it (a) only works for web and does not provide for native application development, and (b) does not provide for differentiated user experiences through the of targeting specific device characteristics. Further, existing native application development platforms using JavaScript, HyperText Markup Language (HTML) and Cascading Style Sheets (CSS) are limited to native applications and lack the ability to efficiently target different devices.

Accordingly, systems and methods are needed for the delivery of content, behaviors, and experiences tailored to different type of devices without having to write different versions of code for each device and without the need for maintaining a comprehensive database of device characteristics.

BRIEF SUMMARY

Systems and methods are described for developing and delivering device-specific web and native application content. In one aspect, templates are provided that each include content compatible with a device that has various associated characteristics, such as particular hardware and/or software configurations. A request for content is received from a requesting device. The request includes a device identifier indicative of one or more characteristics associated with the requesting device. One or more of the templates are then selected based on the device identifier and are used to generate content compatible with the requesting device. The generated content can then be provided to the requesting device.

Additional aspects of the invention include corresponding systems and computer programs.

The templates can be configured in a hierarchy, with at least one of the templates having an inheritance relationship with one or more other templates in the hierarchy. For example, a particular template associated with a combination of device characteristics can inherit content from one or more templates that are each associated with a general device characteristic. Further, a particular template associated with a combination of device characteristics can override content from one or more templates that are each associated with a general device characteristic. Moreover, a particular template associated with a combination of device characteristics can combine content inherited from a plurality of templates that are each associated with a general device characteristic.

Hardware characteristic can include device model, device type, device brand, screen size, screen resolution, and pixel density, while software characteristics can include page type, platform, and browser information. The requesting device can be a smart phone, a tablet, a feature phone, a desktop computer, a portable computer, a smart watch, or smart glasses, and the device identifier can be a user agent string.

In one implementation, one or more patterns are identified in the device identifier, and the templates are selected based on at least one of the identified patterns.

The generated content can include content for a native application or a web-based application, and can include, for example, structure of the requested content, data of the requested content, presentation rules for data of the requested content, and behavior for the request content.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
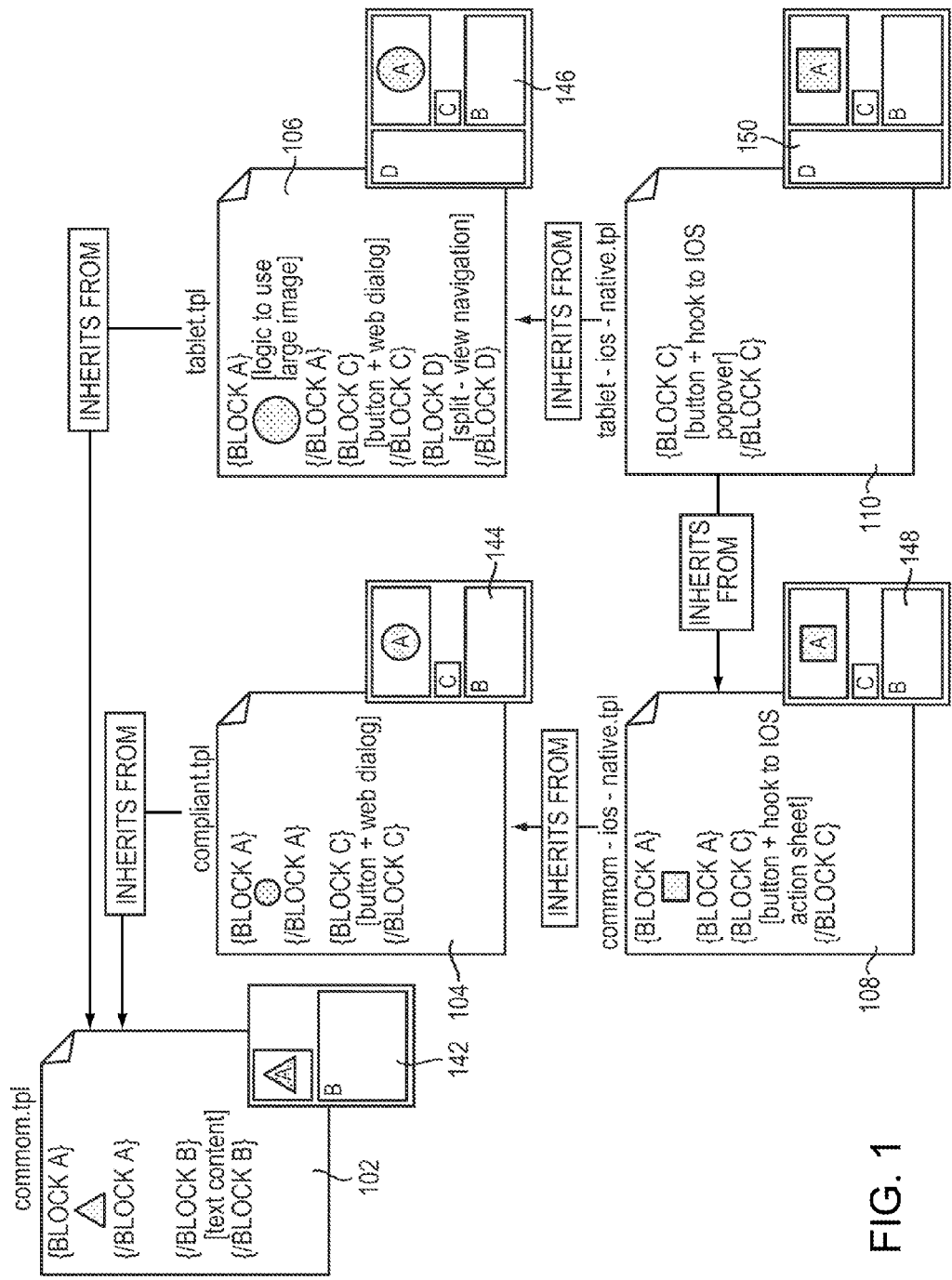
FIG. 1 is a diagram illustrating a template inheritance structure according to an implementation.

Described herein are various implementations of methods and supporting systems for developing and delivering platform-adaptive web and native application content. Specifically, the present disclosure provides for the recognition of a particular device, its platform, and/or other hardware or software characteristics of the device based on the application of a pattern-matching technique to one or more identifiers associated with the device. Upon identifying the device characteristics, content (e.g., code, functionality, applications, configurations, images, video, audio, or other assets for web and/or native applications) tailored to these characteristics can be generated and/or provided to the device. For example, the provided content can be code that is compatible with the operating system, hardware, and/or related interfaces of the device. In another example, the provided content can be optimized for display on the device, e.g., images positioned and sized to fit for a particular screen size and resolution. Content can also include applications specifically designed and/or customized for the device and its various characteristics.

Devices can be classified by any suitable device characteristic or feature, such as by device type, form factor, model, brand, physical configuration, screen size, screen resolution, pixel density, platform, operating system, native or web-based application configuration, other device hardware characteristic, other device software characteristic, and/or any combination thereof. Devices can be categorized at any level of specificity or generality. For example, a particular Apple® iPhone can be classified at a high level of specificity as an "Apple® iPhone 5S with a 4-inch diagonal, 1136×640 pixel display, running iOS 7.1 with Safari 7.05," and can be classified at a low level of specificity (i.e., a high level of generality) as a "smartphone."

In one implementation, the present system uses an inheritance-based template structure for device characteristics. This allows for the delivery of device-appropriate content to devices in a manner that does not require reliance on or maintenance of a device database (e.g., WURFL) or other collection of data containing an aggregation of identifiers for each combination of device characteristics. Further, the system eliminates the need to maintain individualized content for each combination of device characteristics, which can be error-prone and require substantial upkeep.

Each device characteristic or subset of characteristics can be associated with a template including or otherwise relating to compatible content (e.g., code, functionality, applications, configurations, images, video, audio, or other assets for web and/or native applications) that can be provided to a device having that characteristic or subset of characteristics. In some implementations, a template can have an inheritance relationship within one or more other templates. For example, a template can inherit some or all of the content in or associated with one or more other templates, as further described below.

In one example, an "Android" template includes and/or is associated with functionality that performs as desired on most or all Android-based devices. For example, the Android template can include code for displaying images in a native application, which code is compatible with all devices running an Android-based operating system. A device template associated with a more granular, or specific, device characteristic (or more specific combination of characteristics) can inherit from the Android template in order to provide for the generation or providing of functionality specific to Android devices. For example, a template for an "Android-based Samsung tablet device" can inherit content from the Android template, and can also inherit content from a general "tablet" template and/or a general "Samsung" template to allow for the providing of content generally compatible with tablet and Samsung devices, respectively. The Android-based Samsung tablet device template can also include or be associated with additional content to support features specific to an Android-based Samsung tablet device. Alternatively or in addition, the Android-based Samsung tablet device template can override certain content from the Android, Samsung, and/or tablet templates with its own content, and/or implement various interfaces associated with those templates.

The inheritance template structure advantageously allows reductions in content maintenance and repetitive development; e.g., minimal additional coding, asset creation, etc. is necessary to support new or different device characteristics. A template can inherit from a single base template, or can inherit from multiple, more generic templates. For example, to support a new Apple® iPhone device with iOS 7 and a larger screen (e.g., an "Apple® iPhone, iOS 7 device, 5 inch diagonal display" template), a new template can inherit base content from an "iPhone" template and an "iOS 7" template, and only the content needed to support the new screen size for the device must be developed and associated with the new template.

One implementation of a template hierarchy is illustrated in FIG. 1. The Common Template 102 ("common.tpl") includes content that is compatible with devices having a wide variety of characteristics (e.g., compatible with both smart phones and tablets, with all versions of iOS, etc.). Thus, Common Template 102 has a high level of generality in terms of the device characteristics it supports. In this simplified example, Common Template 102 includes two content blocks: Block A and Block B. Block A includes an image element, specifically a triangle image, and Block B contains text content. Content display 142 illustrates how the content from Common Template 102 is ultimately displayed on a particular device (e.g., in a web or native application).

The Compliant Template 104 ("compliant.tpl"), which includes content compatible with web applications for compliant smart phone devices, has a direct inheritance relationship with Common Template 102. Specifically, Compliant Template 104 inherits Block B, overrides Block A from Common Template 102 by defining its own Block A (here, a different, circle image), and includes a new functional block (Block C) that defines code for a button that invokes a web dialog box. Content display 144 illustrates how the content from Compliant Template 104 is displayed on a particular compliant device. The Tablet Template ("tablet.tpl") 106, which includes content compatible with web applications for tablets, also has a direct inheritance relationship with Common Template 102. Specifically, Tablet Template 106 inherits Block B, overrides Block A from Common Template 102 by defining its own Block A (here, defined logic to use a larger image), and includes new Block C (functionality for a button which invokes a web dialog) and Block D (a navigation element unique to tablet devices). Content display 146 illustrates how the content from Tablet Template 106 is displayed on a particular tablet device.

The iOS Native Template 108 ("common-ios-native.tpl"), which includes content compatible with native applications on iOS-based compliant devices, has a direct inheritance relationship with Compliant Template 104 (and an indirect inheritance relationship with Common Template 102). Specifically, iOS Native Template 108 inherits Block B from Common Template 102 and overrides Blocks A and C from Compliant Template 104 by replacing Block A with a different, square image and Block C with a functionality for a button that has hooks to iOS actionsheet functionality (rather than a web dialog box). Content display 148 illustrates how the content from iOS Native Template 108 is displayed for a native application on an iOS-based compliant device.

The iPad Native Template 110 ("tablet-ios-native.tpl"), which includes content compatible with native applications on iOS-based tablet devices, has a direct inheritance relationship with Tablet Template 106 and iOS Native Template 108 (and an indirect inheritance relationship with Common Template 102 and Compliant Template 104). Specifically, iPad Native Template 110 inherits Block B from Common Template 102, inherits Block D from Tablet Template 106, inherits a combination of Block A from iOS Native Template 108 and Block A from Tablet Template 106 (namely, the square image from iOS Native Template 108 and the larger image logic from Tablet Template 106, thereby resulting in functionality defining a larger square image), and overrides Block C from Tablet Template 106 by replacing Block C with a button having hooks to iOS popover functionality (instead of a web dialog or iOS action sheet). In other words, the iOS templates 108, 110 provide web-dialog-equivalent functionality for iOS devices through iOS-specific interfaces. Content display 150 illustrates how the content from iPad Native Template 110 is displayed for a native application on an iOS-based compliant tablet device.

It is to be appreciated that one or more templates can be provided, and each template can contain various types of content (e.g., blocks defining code, assets, functionality, etc.). Further, each template can directly and/or indirectly inherit and/or override content from none, one, or multiple other templates. Content inherited from multiple templates can be combined or, in other instances, content inherited from one template can take precedence over, and thereby replace, content inherited from another template.

Figure 2:
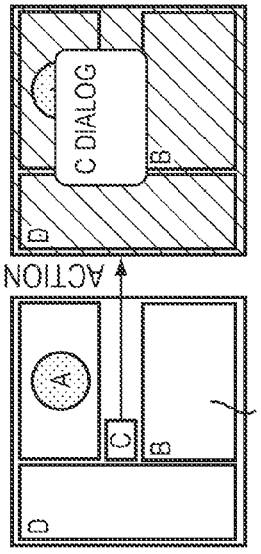
FIG. 2 is a diagram illustrating device-specific content generation according to an implementation.

FIG. 2 illustrates a number of examples on how the present system generates applications and other content for different types of devices, with reference to the template hierarchy described in FIG. 1. For a basic device (e.g., a device that has no combination of characteristics matching a more specific template), the system provides content (shown in content display 142) based on the Common Template 102, resulting in the display of an image as defined by the template (i.e., the triangle image) in Block A and a body of text as defined in Block B.

For a compliant smart phone web application, the system provides content (shown in content display 144) based on the Compliant Template 104, resulting in the display of a different image based on Block A of the Compliant Template 104 (i.e., the circle image), but the same body of text as in Block B of the Common Template 102. This is because the Compliant Template 104 does not contain a Block B that would otherwise override or redefine the Block B of the Common Template 102. In addition, the Compliant Template 104 includes functionality in Block C for a button that invokes a web dialog 145 upon a user interacting with the button, resulting in the button being generated in the web application on the compliant smartphone.

For a compliant smart phone native iOS application, the system provides content (shown in content display 148) based on the iOS Native Template 108, resulting in the display of a different image based on Block A of the iOS Native Template 108 (i.e., the square image) and, as with the Compliant Template 104, the same body of text as in Block B of the Common Template 102. The button generated based on Block C of the iOS Native Template 108 invokes an iOS-native actionsheet 149 (rather than a web dialog box as otherwise defined in the Compliant Template 104). Likewise, for a compliant smart phone native Android application (content shown in content display 148) which has an associated template that also inherits from the Compliant and Common Templates 104, 102, a native Android dialog 153 can be invoked upon a user's interaction with the button generated based on the compliant smart phone native Android application template.

Templates inheriting from the Tablet Template 106 can receive functionality relating to increasing image size (Block A) and providing a split view (Block D). Accordingly, corresponding tablet versions of the web application, iOS native application, and Android native application templates can provide content similar to their compliant smart phone counterparts, with the addition of larger images and split-view navigation (shown in content views 146, 150, and 154, respectively). One skilled in the art will appreciate the various forms and combinations of content that can be generated based on the template structure described herein.

Figure 3B:
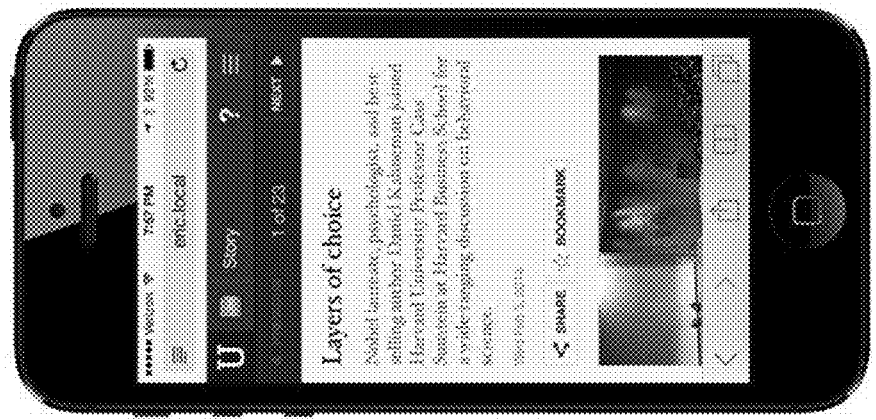
FIGS. 3A-3D depict example generated native and web-based application content according to an implementation.
Figure 3A:
Figure 3D:
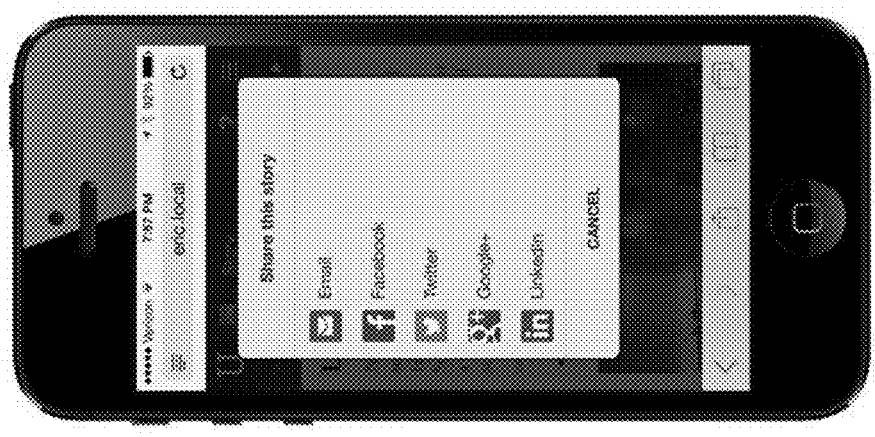
Figure 3C:
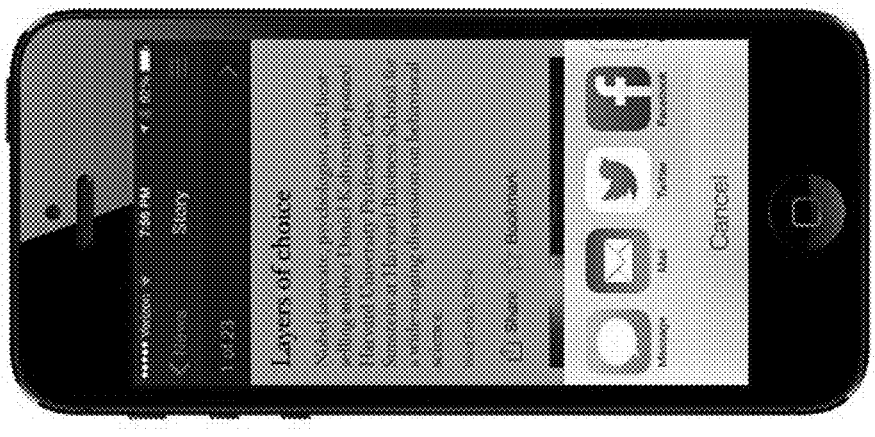

FIGS. 3A-3D depict example generated content on an Apple® iPhone device using the techniques described herein. Notably, the template hierarchy provides for the generation of identically or similarly displayed and functioning content not only on different devices having varying characteristics, but also within different applications on the same device. For example, FIG. 3A illustrates content generated for a native application, including text, images, and "Share" and "Bookmark" buttons that are native functional components of the device operating system. FIG. 3B depicts the same content generated for the same Apple® iPhone device, but as web-based content for a web-based application (e.g., a web browser). The layout and content (text and images) are substantially the same as in the native application (FIG. 3A), and the "Share" and "Bookmark" buttons are generated instead as web-based functional components (e.g., using JavaScript code). FIG. 3C depicts a native sharing menu that is displayed when a user selects the "Share" button shown in FIG. 3A. Likewise, FIG. 3D shows a web-based sharing dialog that is displayed when a user selects the "Share" button shown in FIG. 3B.

Of note, although the content generated for the native and web-based applications can include different underlying code, assets, and so on, to provide substantially the same appearance and functionality, the present techniques allow the content framework to be defined once and the underlying code to be automatically generated for each supported device and application, thus obviating the need to manually create and maintain unique code for each device/application. In some implementations, when the content framework includes a function that is native to a particular device (e.g., the "Share" functionality shown in FIG. 3C), that native function can be invoked by the code generated based on one or more templates associated with the characteristics of the device. On the other hand, when native functionality is unavailable on a device, the generated code can include web-based or other custom code that produces the desired content on the device.

Figure 4:
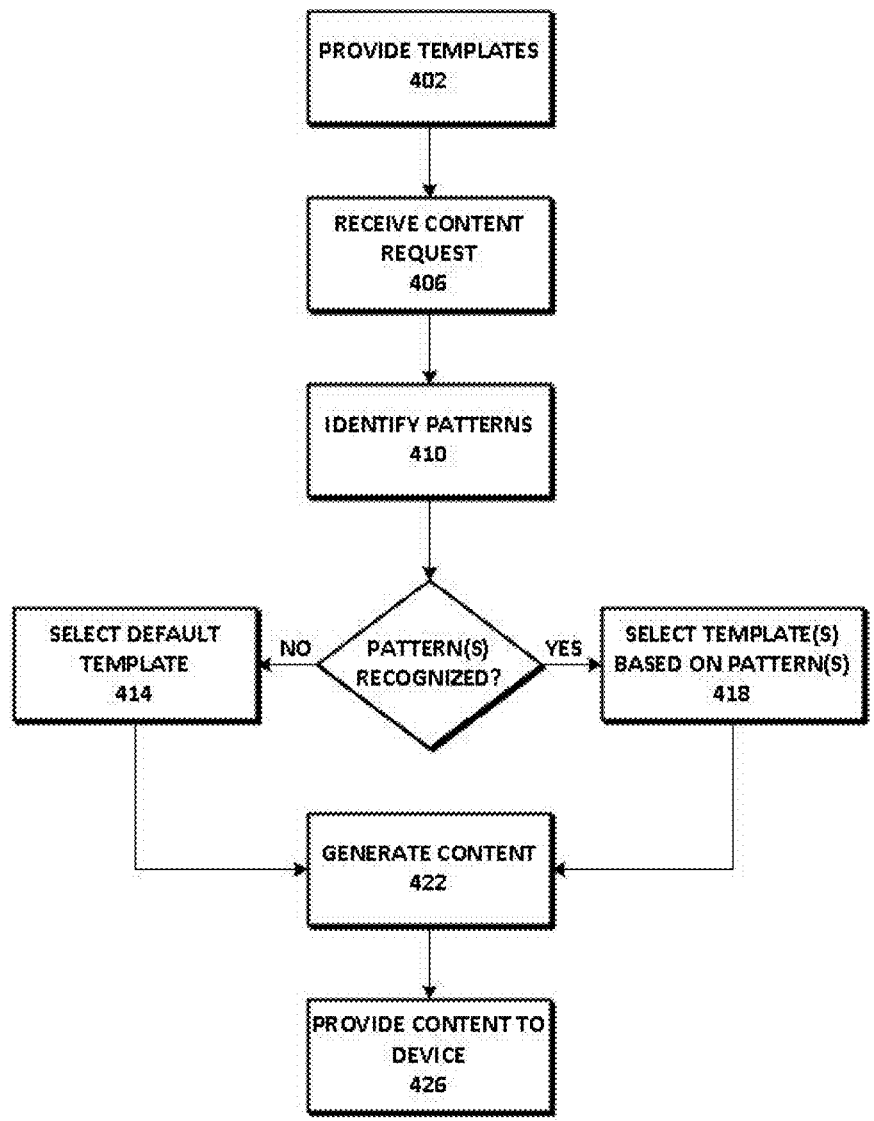
FIG. 4 is a flowchart illustrating a method for providing device-specific content according to an implementation.

FIG. 4 depicts one implementation of a method for providing native and web-based application content. In STEP 402, a plurality of templates are defined or provided and stored on a memory for reference by the present system. The templates can be configured as described herein (e.g., arranged in a hierarchy) and include content compatible with a device that has one or more particular characteristics (e.g., hardware and/or software characteristics). In STEP 406, a request for content (e.g., a native or web-based application or content therefor) is received from a requesting device (e.g., smart phone, tablet, portable computer, etc.). Included with the request is a device identifier (e.g., user agent string or other identifier) that includes information indicative of one or more characteristics associated with the requesting device (e.g., model, form factor, web browser, etc.). The requesting device characteristics can be identified by, for example, matching patterns in the device identifier, parsing out keywords or other tokens, or other suitable method of identification (STEP 410).

In one implementation, device characteristics are identified using pattern matching on user agent strings. Pattern matching (as opposed to exact matching or chained substring matching against an exhaustive database of thousands of user string possibilities) is more efficient, faster, easier to maintain, and more likely to correctly categorize new devices within existing categories. The system can incorporate any appropriate form of pattern matching (e.g., regular expressions). Generally, a user agent string contains a number of fields identifying various characteristics associated with a device, such as product name (e.g., "Mozilla"), product version (e.g., "5.0"), operating system (e.g., "Linux"), platform, browser, layout engine, and so on. For example, a mobile Android device can have a user agent string of "Mozilla/5.0 (Linux; U; Android 4.2.1; en-is; LG-L720 Build/F31G6K) AppleWebkit/534.30 (KHTML, like Gecko) Version/4.0 Mobile Safari/534.30." Based on the user agent string, various properties of the hardware and/or software of the device can be determined. For example, in the example above, the "LG-L720" may be a recognized smartphone with a known type of processor, screen size, screen resolution, operating system type, and the like. The specific code to be delivered to the device can then be based on at least a subset of the user agent string components and the additional properties determined therefrom.

If the system is unable to recognize any device characteristics based on the device identifier (e.g., no patterns applied against the device identifier result in matches), a default template can be selected (STEP 414). The default template can include content likely to be compatible with most or all devices, such that content provided from or generated based on the default template has a reasonable probability of displaying and functioning as intended on the unrecognized device. If, however, one or more device characteristics are recognized based on the device identifier, a template (or templates) corresponding to a particular recognized device characteristic or combination of recognized characteristics can be selected for generating or otherwise providing content (STEP 418). For example, if the user agent string above is provided as the device identifier, a template associated with a web-based application for an Android smart phone by LG can be selected.

Following selection of the template(s) (default or otherwise), the system can generate content requested by and that is intended to be compatible with the requesting device based on the content included in and/or referenced by the selected template(s) (STEP 422). The generated content can then be provided to the requesting device (STEP 426).

In one implementation, the system component that parses the device identifier returns a set of values formed in a data structure (e.g., a JavaScript Object Notation (JSON) dataset). The data structure can include a series of patterns and identify the values that match each pattern, if any. A custom dataset file, which contains extensions and/or overrides to a canonical dataset, can also be constructed, and such a custom dataset can be searched before the canonical dataset, allowing control over the device detection process.

The data structure can include standard or custom attributes based on a device identifier. In one implementation, the data structure includes attributes such as pagetype (type of page to display for native or web-based application), platform, and browser information. Example values of "pagetype" include basic, touch, compliant and tablet. Example values of "platform" include ANDROID, BBPLUS, BLACKBERRY, COMPUTER, FEATUREPHONE, IPHONE, IPAD, PALMOS, SPIDER, SYMBIAN, WEBOS, WINMO, and WINPHONE7. An example JSON file for a device is shown below (note that comments are not permitted in the actual file to conform to JSON specifications, but are shown here, starting with "//", for explanation purposes only).

```
{
    // A device data file includes an object containing a single property,
    // "devices", formed as an array of device blocks.
    "devices" : [
        {
            // A device block contains several properties:
            //   "groupName" : a machine readable identification of the device
            //     or device group.
            "groupName" : "exampleDevice",
            //   "description" : a human readable identification of the device
            //     or device group.
            "description" : "Both revisions of the Example Device produced by Example Company, Inc.",
            //   "classification" : a versioned set of identifications provided
            //     when a device is matched.
            "classification" : {
                // By convention, the highest version number is placed
                // first in the file.
                "2" : {
                    // Supported pagetypes and platforms can be defined
                    // in an associated schema.
                    "pagetype"    : "compliant",
                    "platform"    : "android",
                    "supports_certificate" : true
                },
                // In the event that a classification cannot be found for a
                // given version number, the system attempts to search for
                // the next lowest version. Accordingly, upgrading to a new
                // version of the device detection system component does not
                // require editing of every entry.
                "1" : {
                    "pagetype"    : "webkit",
                    "platform"    : "android",
                    "supports_certificate" : "true"
                }
            },
            // "match" : an array of regex and/or string match blocks which
            // are matched against the device identifier.
            "match" : [
                // Any number of matching blocks can be specified.
                {
                    // In one implementation there are four types of matches.
                    // "prefix" attempts to match the specified string at the
                    //   beginning of the device identifier.
                    "prefix" : "Mozilla/5.0 (exampleDevice-v1"
                },
                {
                    // "suffix" attempts to match the specified string at the
                    // end of the device identifier.
                    "suffix" : "exampleDevice-v2)"
                },
                {
                    // "partial" attempts to perform a literal string match
                    //   within the device identifier.
                    "partial" : "exampleDevice"
                },
                {
                    // "regex" allows regular expression syntax for matching
                    //   any part of the device identifier.
                    "regex" : "exampleDevice-v(1|2)",
                    // Each of the different types of matches can also
                    // include an "options" object that can contain various
                    // modifiers for the match functions.
                    "options" : {
                        "DOT_ALL" : true,
                        "CASE_INSENSITIVE" : true
                    }
                }
            ]
        }
    ]
}
```

Figure 5:
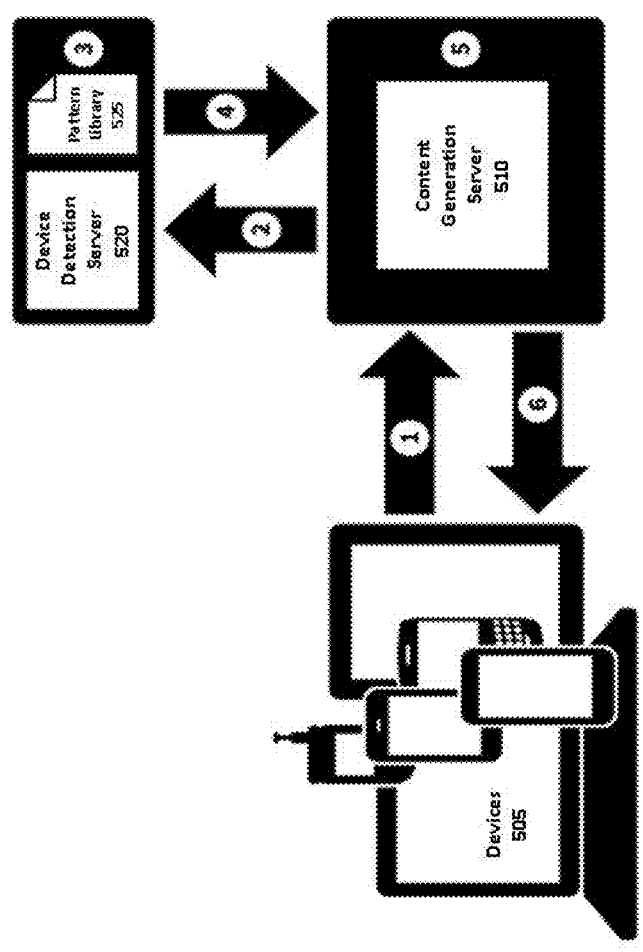
FIG. 5 is a diagram illustrating an example system and data flow according to an implementation.

Referring now FIG. 5, in one implementation, the present system includes a Content Generation Server 510 in communication with a Device Detection Server 520 (locally or over a network). The Content Generation Server 510 further communicates with devices 505 and receives requests for content and device identifiers therefrom, and returns generated content to the devices 505 in response. A user of a device 505 can operate a browser or a native (built on the platform) application on the device 505 to make requests for content to the Content Generation Server 510 (1). The Server 510 receives a device identifier (e.g., a user agent string) from the device 505 and provides the device identifier to a Device Detection Server 520 (2). The Device Detection Server 520 can use pattern matching or other suitable technique on the device identifier using a stored pattern library 525 (3). Matched patterns can translate to a template hierarchy in which more granular combinations of device characteristics inherit the functionality of more general device characteristics.

The Device Detection Server 520 returns to the Content Generation Server 510 sufficient information to generate or otherwise provide content that is intended to be compatible for a device having the determined characteristics (4). For example, the Device Detection Server 520 can return a classification that includes pagetype, platform, and browser information. "Pagetype" can refer to which major source of web page code (e.g., HTML) the device will receive, "platform" can refer to the specific type of device, and "browser information" can refer to the web browser application, version, available plugins, and so on. Based on the returned device classification, the Content Generation Server 510 can generate a set of files and/or code defining, for example, the structure and data of the content requested (e.g., HTML), presentation rules for the data (e.g., CSS), behavior for the content (e.g., JavaScript code), images and other media, and other content (5). The generated content can be specifically tailored to the pagetype, browser, and/or platform specified by the Device Detection Server 520, and accordingly should be compatible with the device (which characteristics were determined based on the device identifier). The generated content is then sent to the requesting device 505 for presentation (6).

Components of the present system (e.g., Content Generation Server 510 and Device Detection Server 520) can utilize appropriate hardware or software and can execute, for example, on a system capable of running a server-class, desktop, or mobile operating system such as the Microsoft Windows® operating systems, the Apple OS X® operating systems, the Apple iOS® platform, the Google Android™ platform, the Oracle® Solaris® operating system, the Linux® operating system and other variants of UNIX® operating systems, and the like. Some or all of the described functionality can be performed remotely, in the cloud, or via software-as-a-service.

The Content Generation Server 510, Device Detection Server 520, and devices 505 can include any suitable software and/or hardware, and can include or operate on a smart phone, feature phone, smart watch, smart glasses, tablet computer, portable computer, television, gaming device, music player, mobile telephone, desktop computer, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, a particular device 505 includes a web browser, native application, or both, that facilitates execution of the functionality described herein. A web browser allows the device 505 to request a web page or other program, applet, document, or resource with an HTTP request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of a device 505 manually requests a resource from a server. Alternatively, the device 505 automatically makes requests with a browser or native application. Examples of commercially available web browser software include Microsoft® Internet Explorer®, Mozilla® Firefox®, and Apple® Safari®.

A communications network can connect devices 505 and Servers 510, 520 directly or indirectly with each other. The communication can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser or native application and the connection among devices 505 and Servers 510, 520 can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A method comprising:
   providing a hierarchy of templates, each template comprising content compatible with a device having one or more associated characteristics, wherein at least one of the templates has an inheritance relationship with one or more other templates in the hierarchy;
   receiving a request for content from a requesting device, the request comprising a device identifier indicative of one or more characteristics associated with the requesting device;
   applying a plurality of patterns to the device identifier to identify portions of the device identifier that match the patterns, each matching portion corresponding to at least one of the characteristics;
   if applying the patterns to the device identifier results in one or more matching portions:
   selecting a subplurality of the templates based on the matching portions of the device identifier; and
   generating content compatible with the requesting device based on a combination of the subplurality of selected templates; and
   if applying the patterns to the device identifier does not result in one or more matching portions:
   selecting a default template; and
   generating content compatible with the requesting device based on the default template.

2. The method of claim 1, wherein a particular template associated with a combination of device characteristics inherits content from one or more templates each associated with a general device characteristic.

3. The method of claim 1, wherein a particular template associated with a combination of device characteristics overrides content from one or more templates each associated with a general device characteristic.

4. The method of claim 1, wherein a particular template associated with a combination of device characteristics combines content inherited from a plurality of templates each associated with a general device characteristic.

5. The method of claim 1, wherein a particular device characteristic is one of a hardware characteristic and a software characteristic.

6. The method of claim 5, wherein the hardware characteristic is selected from the group consisting of device model, device type, device brand, screen size, screen resolution, and pixel density.

7. The method of claim 5, wherein the software characteristic is selected from the group consisting of page type, platform, and browser information.

8. The method of claim 1, wherein the requesting device is one of a smart phone, a tablet, a feature phone, a desktop computer, a portable computer, a smart watch, and smart glasses.

9. The method of claim 1, wherein the device identifier comprises a user agent string.

10. The method of claim 1, wherein the generated content comprises content for a native application or a web-based application.

11. The method of claim 1, wherein the generated content comprises at least one of:
   structure of the requested content, data of the requested content, presentation rules for data of the requested content, and behavior for the request content.

12. The method of claim 1, further comprising providing the generated content to the requesting device.

13. A system comprising:
   one or more computers programmed to perform operations comprising:
   providing a hierarchy of templates, each template comprising content compatible with a device having one or more associated characteristics, wherein at least one of the templates has an inheritance relationship with one or more other templates in the hierarchy;
   receiving a request for content from a requesting device, the request comprising a device identifier indicative of one or more characteristics associated with the requesting device;
   applying a plurality of patterns to the device identifier to identify portions of the device identifier that match the patterns, each matching portion corresponding to at least one of the characteristics;
   if applying the patterns to the device identifier results in one or more matching portions:
   selecting a subplurality of the templates based on the matching portions of the device identifier; and generating content compatible with the requesting device based on a combination of the subplurality of selected templates; and if applying the patterns to the device identifier does not result in one or more matching portions:

selecting a default template; and generating content compatible with the requesting device based on the default template.

14. The system of claim 13, wherein a particular template associated with a combination of device characteristics inherits content from one or more templates each associated with a general device characteristic.

15. The system of claim 13, wherein a particular template associated with a combination of device characteristics overrides content from one or more templates each associated with a general device characteristic.

16. The system of claim 13, wherein a particular template associated with a combination of device characteristics combines content inherited from a plurality of templates each associated with a general device characteristic.

17. The system of claim 13, wherein a particular device characteristic is one of a hardware characteristic and a software characteristic.

18. The system of claim 17, wherein the hardware characteristic is selected from the group consisting of device model, device type, device brand, screen size, screen resolution, and pixel density.

19. The system of claim 17, wherein the software characteristic is selected from the group consisting of page type, platform, and browser information.

20. The system of claim 13, wherein the requesting device is one of a smart phone, a tablet, a feature phone, a desktop computer, a portable computer, a smart watch, and smart glasses.

21. The system of claim 13, wherein the device identifier comprises a user agent string.

22. The system of claim 13, wherein the generated content comprises content for a native application or a web-based application.

23. The system of claim 13, wherein the generated content comprises at least one of:

structure of the requested content, data of the requested content, presentation rules for data of the requested content, and behavior for the request content.

24. The system of claim 13, wherein the operations further comprise providing the generated content to the requesting device.

* * * * *